May 16, 1961  J. C. CHAPRALIS  2,984,038
FISH LANDING NET
Filed July 13, 1959  2 Sheets-Sheet 1
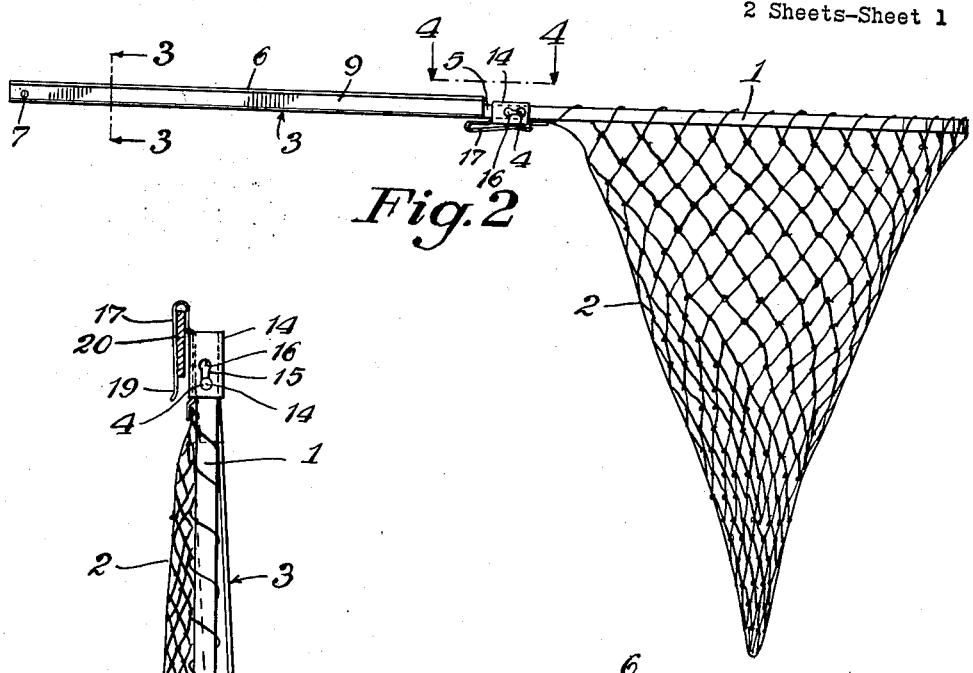
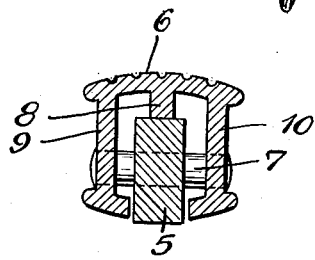
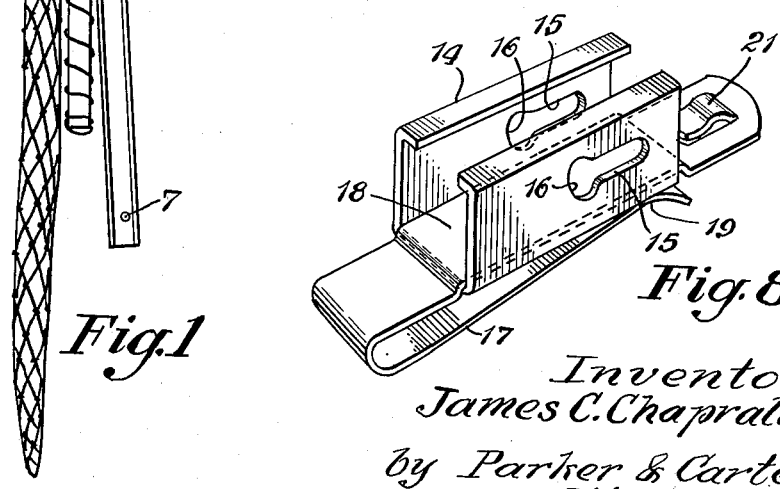
Inventor
James C. Chapralis
by Parker & Carter
Attorneys May 16, 1961
J. C. CHAPRALIS
2,984,038
FISH LANDING NET
Filed July 13, 1959
2 Sheets-Sheet 2
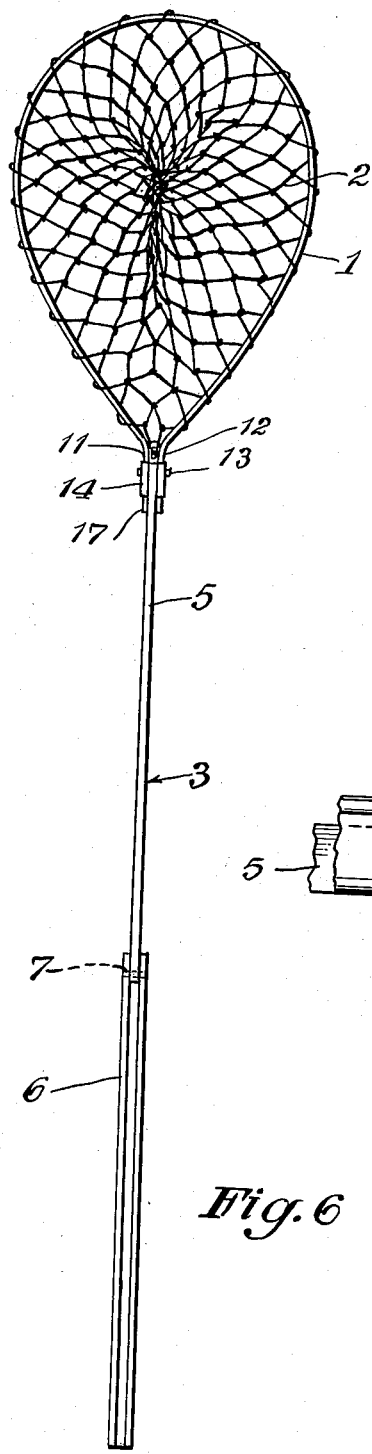
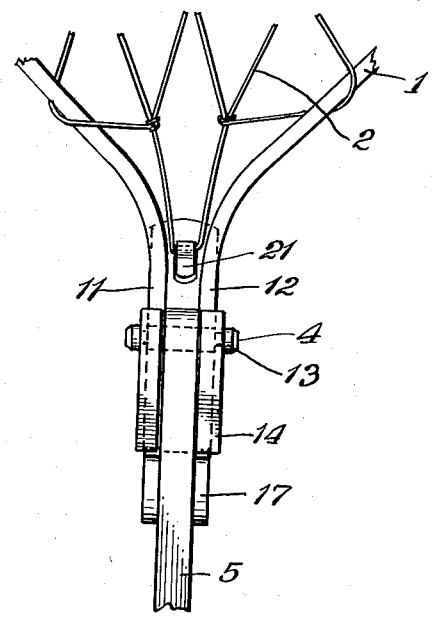
Fig. 4
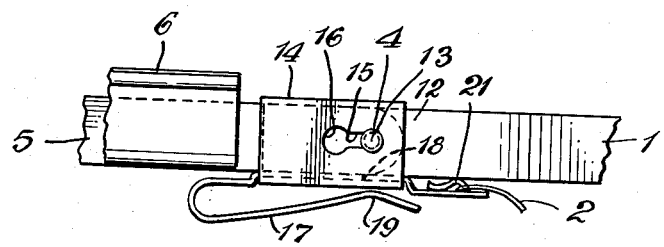
Fig. 5
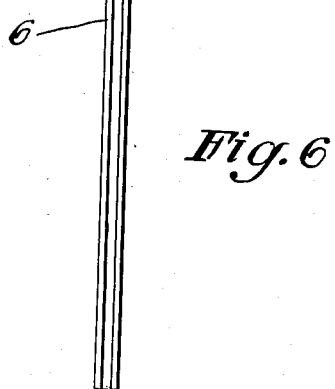
Fig. 6
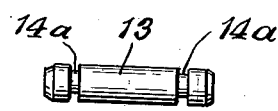
Fig. 7
Inventor
James C. Chapralis
by Parker & Carter
Attorneys United States Patent Office 2,984,038
Patented May 16, 1961

2,984,038
FISH LANDING NET
James C. Chapralis, Chicago, Ill., assignor to Wall-Able Tool & Die Corp., Skokie, Ill., a corporation of Illinois
Filed July 13, 1959, Ser. No. 826,670
4 Claims. (Cl. 43—12)

The present invention is directed to a new and improved fish landing net.

One purpose of the present invention is to provide an extensible landing net which is conveniently foldable into a compact position while requiring only a simple hand motion of the user to extend the net structure.

Another purpose of the present invention is the provision of a fish landing net structure which may be carried in a folded or retracted position on the belt of the user.

Another purpose of the present invention is an improved landing net structure which allows a convenient change-over from one size of landing net to another, while using the same handle.

Another purpose of the present invention is to provide a fish landing net structure with a collapsible handle which in the collapsed or retracted position does not foul the landing net.

Other purposes will appear from time to time in the course of the ensuing specification and claims.

Referring generally now to the drawings:

Figure 1 is a side elevation of the landing net constituting the present invention but in the folded or retracted position;

Figure 2 is a side elevation of the improved landing net in a partly extended position;

Figure 3 is a sectional view taken along the section lines 3—3 of Figure 2 on an enlarged scale;

Figure 4 is a showing of a portion of the net taken along the section lines 4—4 of Figure 2;

Figure 5 is an enlarged view of certain elements illustarted in Figure 2;

Figure 6 is a plan view of the net shown in the fully extended position;

Figure 7 is a side elevation of a pivot pin; and

Figure 8 is a detail view in perspective illustrating an element shown in side elevation in Figure 5.

Like elements are designated by like characters throughout the specification and drawings.

Referring specifically now to the drawings and in the first instance to Figure 1, numeral 1 designates a bowed frame which may carry a conventional fish landing net 2. Numeral 3 generally designates a handle structure which is pivoted to the bowed frame as at 4.

As will be seen best in Figure 6, the handle 3 is comprised of two sections 5 and 6 which are pivoted together as at 7. The outer handle 6 is preferably formed as a channel shaped member, as will be seen best in Figure 3, so that when in the extended position (shown in Figure 6) the open side of the channel faces downwardly. When in the retracted position (shown in Figure 1) the open side of the channel faces outwardly whereas the closed side faces inwardly towards the net 2. The channel preferably includes a longitudinally extending and centrally disposed rib 8 on the upper, inner side thereof so that the section 5, when nested within the channel 6, may abut against this rib. It should be noted that the cross-sectional area of the section 5 is smaller than that of the open area in the channel so that the secion 5 moves readily into the space between the leg portions 9 and 10 of the channel. The channel is made sufficiently large so as to be easily grasped by the hand of the user.

The bowed frame 1 includes two leg portions 11 and 12 which are pivoted to the end of the handle section 5 as by a pivot pin 13. A U-shaped clip or bracket 14 embraces the sides of the legs 11 and 12 of the net frame and is slidably mounted on these leg portions of the frame. Each side of the clip 14 includes an elongated opening 15 having one end thereof enlarged with respect to the diameter of the pin 13, as at 16. The pin 13 carries small grooves 14a adapted to be engaged by the walls of the small portion of the slot. Thus when the parts are in the position illustrated in Figure 5 the pin is locked against accidental displacement. When the clip 14 is moved forwardly on the legs 11 and 12, the end enlargement 16 of the opening 15 moves over the pin and the pin may then be axially removed through the legs 11 and 12 and handle section 5.

A belt clip 17 has one end portion thereof 18 secured to the clip 14. The outer portion of the belt clip 17 is bent inwardly towards the clip as at 19. The clip 17 may be made of spring metal so as to resiliently grip a belt or other object, such as is designated at 20 in Figure 1, between the clip 14 and the portion 19. The other end of the clip extends beyond the bracket 14 and into that area adjacent the point of divergence of the legs 11 and 12. This end portion is provided with a tab 21. In use, one or more loops of the net 2 are hooked around the tab 21 to thereby bring the net in closely adjacent to the point of divergence of the leg portions 11 and 12.

Whereas I have shown and described an operative form of the invention, it should be understood that this showing and description thereof should be taken in an illustrative or diagrammatic sense only. There are many modifications to the invention which will fall within the scope and spirit thereof and which will be apparent to those skilled in the art. The scope of the invention should be limited only by the scope of the hereinafter appended claims.

The use and operation of the invention are as follows:

The invention contemplates the use of three connected sections to form a fish landing net. One section is formed by the bowed net frame 1 while the other two sections are formed by the handle sections 5 and 6. In use, the outer handle section 6 is folded over the section 5 so that the section 5 is nested within the section 6 and then the two sections are folded about the pivot point 4 and into the position illustrated in Figure 1. The net may then be conveniently hung on the belt of the user as by the use of the clip 17. It should be noted that when the net frame is suspended (as apepars in Figure 1) the handle 3 is inclined outwardly with respect to the general plane of the net frame 1. This allows the user to conveniently grasp the handle without interfering with the net 2. Such disposition of the handle 3 with respect to the next frame 1 is brought about by the use of the extension of the belt clip 17 and the looping of the net 2 around the tab 21 on the extension. When in the folded or retracted position, that end of the handle nearest the pivot 4 tends to contact the portion of the net secured by the tab 21, thus disposing the handle 3 at the outwardly inclined position.

In the event the user of the net desires to employ different sizes of net frames and nets, it is only necessary to exert finger pressure on the belt loop of the clip 17 and slide the bracket 14 outwardly toward the net until the pin 13 fits within the enlargement 16. The pin may then be removed by passing it in the direction of its axis and through the legs 11 and 12 and handle section 15. A different size of net frame may then be secured to the handle section 5 by inserting the legs into the bracket 14 in embracing relation to the handle section 5, inserting the pin 13 and then moving the bracket in the opposite direction.

The user of the net may conveniently move it from his belt and extend the net with a simple handle motion. Such removal of and extension of the net is brought about by grasping the handle 3 with one hand, moving the assembly upwardly away from the belt 20, followed by an upward movement of the handle 3 about the pivot axis 4, and a rotation of the handle to allow the handle sections to pivot, by gravity, to the extended position.

I claim:

1. A foldable fish landing net assembly including a net frame and a handle pivotally connected to one end of said frame, said handle being comprised of pivotally connected sections, one of said sections being disposed adjacent said net frame and the other of said sections being adapted to receive said first-named section in nested relation said last-named section being formed as a channel member having an opening adapted to receive said other section, said channel member including an internal longitudinally extending rib adapted to form an abutment for said first-named section in either the folded or extended position of said sections.

2. An extensible fishing net assembly including a net frame having a net disposed thereon and an extensible handle pivoted to one end of said frame, said handle being adapted for movement between a first position extending away from said frame and a second position overlying said frame, and a net hook positioned on said frame end and extending inwardly of said frame from and adjacent said pivot point, said net hook being adapted to receive a portion of the net whereby such portion of the net contacts the handle member when the handle member is in said overlying position and holds said handle member at an outwardly inclined position with respect to the general plane of said frame.

3. A collapsible fish landing net structure including a net frame having spaced leg portions, a handle member pivoted to said leg portions and extending between said leg portions, a bracket slidably mounted on said leg portions, said bracket being generally U-shaped and having openings in the legs thereof, a pivot pin slidably mounted in said openings, each of said openings being elongated with respect to said pivot pin and having one end portion thereof enlarged with respect to the diameter of the pivot pin, said pivot pin having grooved portons adapted to receive the walls of said openings, whereby when said bracket is moved to one position wherein the pin abuts against the small portion of said opening, said pin is held against removal and when said bracket is moved to another position said pin may be removed through the enlarged portions of said openings.

4. The structure of claim 3 characterized by and including a belt clip mounted on said bracket, said clip having an extension with a hooked tab disposed adjacent the point of divergence of said leg portions, movement of said bracket being effected by a manual push on said belt clip.

References Cited in the file of this patent
UNITED STATES PATENTS

| | | |
|---|---|---|
| 1,515,466 | Dore | Nov. 11, 1924 |
| 1,957,944 | Dexter | May 8, 1934 |
| 2,600,773 | Hungerford | June 17, 1952 |